3,297,623
GRAFT OF POLYDIENE WITH ACRYLATE AND METHYLOL ACRYLAMIDE
Karl-Heinrich Knapp, Leverkusen, Gustav Sinn, Bergisch Neukirchen, and Karl Dinges and Karl-Heinz Ott, Cologne-Stammheim, Germany, assignors to Farbenfabriken Bayer Aktiengesellschaft, Leverkusen, Germany, a corporation of Germany
No Drawing. Filed Feb. 12, 1963, Ser. No. 257,833
Claims priority, application Germany, Feb. 14, 1962, F 36,029
7 Claims. (Cl. 260—29.7)

The present invention relates to stable aqueous dispersions of elastic and age-resistant copolymers which may easily be converted into insoluble, completely cross-linked polymers by the action of heat and/or acid, as well as a process for making such copolymer dispersions.

It is known to polymerize acrylic acid esters with other polymerizable compounds in aqueous dispersion.

It is further known that by incorporating relatively small quantities of, for example, methylol compounds or Mannich bases of acrylic acid amide dispersions by polymerization, that copolymers may be prepared which may be converted into cross-linked products by the action of heat and/or acid.

The known dispersions of acrylic acid ester polymers have, however, the disadvantage that films produced from them have only slight elasticity and low strength.

In addition, it is known to produce dispersions of copolymers containing high proportions of butadiene, isoprene or chloroprene. The films, coatings etc. obtainable from such dispersions generally have good elastic properties. However, they have the disadvantage that, owing to their unsaturated character, they are discolored and become brittle under the influence of light, heat and atmospheric oxygen. Although the unfavourable effect of the diene on the ageing properties is not so great when only small proportions of dienes are incorporated by polymerization, for example below 30%, the elasticity of films prepared from such copolymer dispersions is also less. It is not possible, moreover, to obtain stable, aqueous dispersions of copolymers by using only a small proportion of diene, e.g. butadiene, and a high proportion of acrylic acid esters if these copolymers also contain methylol compounds.

It is also known to polymerize methacrylic acid methyl esters in aqueous emulsions in the presence of butadiene polymers. These known graft copolymers of butadiene polymers and major proportions of methacrylic acid methyl esters, however, are rigid, firm and hard thermoplastic materials whose aqueous dispersions are not suitable for the manufacture of coatings and impregnations and for use as bonding agents for pigments and fibres because they are not capable of forming coherent, soft and elastic films. Moreover, such polymers, which are only cross-linked to a small extent dissolve or swell in organic solvents. Graft copolymers of butadiene polymers and acrylic acid esters are also known, but again they have the disadvantage that they are either soluble or at least strongly swelling in organic solvents.

It has now been found that stable aqueous dispersions of copolymers having excellent elasticity and strength and at the same time high resistance to ageing and, moreover, capable of being converted into cross-linked products under the influence of heat and/or acid may be obtained by carrying out a graft polymerization in aqueous emulsion or dispersion with (a) 1–50% of a polymer of an aliphatic conjugated diolefine, (b) 98.8–30% of an acrylic acid ester with 1–8 carbon atoms in the alcoholic alkyl group and (c) 0.2–20% of an acrylamide methylol derivative of the general Formula I:

(I) 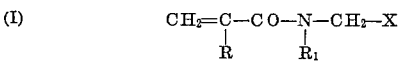

wherein X represents a member such as —O—R$_2$, —O—R$_3$—Z or

i.e. more specifically an acrylamide methylol ether of the general Formula II as well as an acrylamide Mannich base of the general Formula III (II) 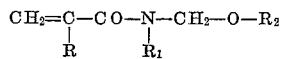

(III) 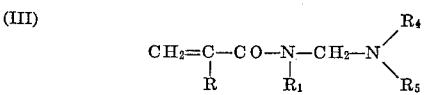

In the above formulae which characterize component (c) of the copolymers to be prepared in accordance with the invention, R=hydrogen or a methyl group,
R$_1$=hydrogen or an alkyl group with 1–8 carbon atoms,
R$_2$=an alkyl group, branched or unbranched, saturated or unsaturated, with preferably 1–10 carbon atoms,
R$_3$=an alkenyl group with 1–3 carbon atoms and
Z=a —COOH, —OSO$_3$H (Na, K, NH$_4$), —SO$_3$H (Na, K, NH$_4$) or —CN group or a group —(CH$_2$CH$_2$O)$_n$H where n=1–20 or represents halogen,
R$_4$ and R$_5$=an alkyl group with 1–8 carbon atoms, a cycloalkyl radical or a —R$_3$—Z group as specified above, where R$_4$ and R$_5$ may be the same or different, and whereby in the radical

R$_4$ and R$_5$ together with the adjacent N-atom may form a heterocyclic ring system such as a piperidine radical or a morpholine radical.

The following are examples of compounds which correspond to the above-mentioned types:

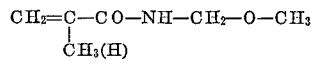

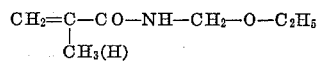

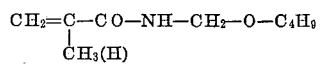

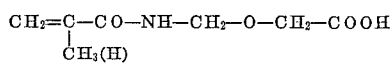

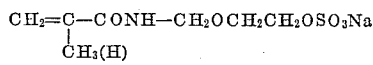

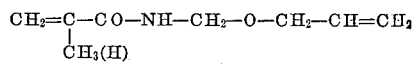

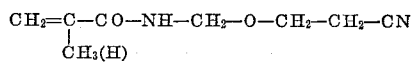

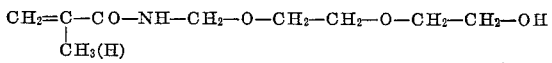

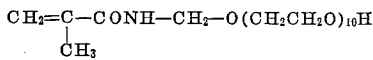

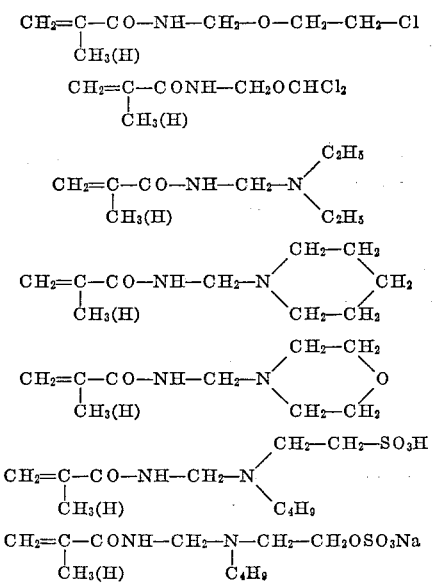

In the present process, polymers of aliphatic conjugated diolefines are understood to mean homopolymers, which have been polymerized in aqueous dispersions or are present as latex, of aliphatic conjugated diolefines having from 4 to 6 carbon atoms, particularly 1:3-butadiene, isoprene or 3-chlorobutadiene or copolymers of these dienes with other compounds that can be copolymerized with them, e.g. styrene, halogen styrenes, styrenes alkylated in the nucleus, α-methylstyrene, acrylic acid esters, methacrylic acid esters, acrylonitrile, vinyl ether, acrylic- and methacrylic acid and acrylic- and methacrylic acid amide. These polymers may be prepared by the known and usual processes by polymerization of the monomer compounds in aqueous emulsion.

Where these polymers are copolymers, their conjugated diolefine content should be at least 50%.

Examples of preferred copolymers are copolymers of butadiene with acrylonitrile, with an acrylonitrile content of about 35%, copolymers of butadiene with styrene with a styrene content of about 30%, ternary copolymers of butadiene (about 60%), styrene (about 20%) and acrylonitrile (about 20%) and copolymers of butadiene and acrylic acid esters, containing, for example, about 60% butadiene and 40% methacrylic acid methyl ester.

Esters of acrylic acid containing 1–8 carbon atoms in the esterifying alcohol part may be used as copolymer components (b). Examples of these are: Acrylic acid methyl ester, acrylic acid ethyl ester, acrylic acid butyl ester, acrylic acid isobutyl ester and acrylic acid-2-ethyl hexyl ester.

Polymerizable compounds (d) which may replace up to 50% of the acrylic acid ester components (b) may be:

Methacrylic acid esters with 1–12 carbon atoms in the ester alkyl group, methacrylic acid, methacrylamide, acrylic acid, acrylamide, styrene, styrenes substituted in the nucleus, α-methylstyrene, vinyl chloride, vinylidene chloride, vinyl ether, and vinyl esters such as vinyl acetate or vinyl propionate, maleic acid and their derivatives, especially a maleic acid ester with a lower allyl radical (having 1–5 carbon atoms).

The graft copolymers according to the invention preferably contain 3–30% of diene polymers, 94.5–60% acrylic acid esters and 0.5–10% of compounds of the type I or II. Up to 50% of the acrylic acid ester may, if desired, be replaced by other polymerizable compounds (d).

The prepartion of the stable aqueous dispersions of graft copolymers consisting of 1–50% diene polymer, preferably a butadiene homopolymer or butadiene copolymer 98.8–30% acrylic acid ester, 0.2–20% of an acrylamide methylolether or acrylamide-Mannich compound and, if desired, other polymerizable compounds in quantities up to 50% of the acrylic acid ester is carried out by polymerization of the compounds in aqueous emulsion or dispersion.

The diene homo- or copolymer present in the form of latex is generally diluted with water for this purpose. After adding emulsifier and, if necessary, pH regulating agents, the monomers are dissolved in this mixture if they are water-soluble or emulsified in it if they are insoluble in water. Polymerization is started under controlled temperature conditions by the addition of catalysts. In most cases, polymerization is carried out at temperatures of 10–80° C. but lower or higher temperatures may, theoretically be used.

Anionic and non-ionic as well as cationic surface-active compounds may be added as emulsifiers in the usual quantities of 0.1–15% calculated on the amount of copolymer. Examples of anionic emulsifiers are: Sodium-, potassium- or ammonium salts of alkyl sulphuric acid esters with 8–20 carbon atoms in the alkyl group, salts of alkyl sulphonic acids with 8–20 carbon atoms, salts of resinic acids of the type abietic acids, alkali metals or ammonium salts of long-chain mono-carboxylic acids, especially of aliphatic saturated monocarboxylic acids having from 10–18 carbon atoms, semi-esters of saturated or unsaturated di-carboxylic acids with long-chain monohydric alcohols, salts of sulphonated oils, such as castor oil, sulfosuccinates, such as sodium octyl sulfosuccinate and the like. Suitable cationic emulsifiers are for example salts of inorganic or organic acids and alkyl amines, aryl as well as alkylaryl amines or resin amines, especially with amines having a long-chain alkyl radical (10–20 carbon atoms), such as dodecyl amine hydrochloride, salts of quaternary ammonium compounds having a long-chain alkyl radical (10–20 carbon atoms). Suitable non-ionic emulsifiers are reaction products of ethylene oxide with phenols and alkyl phenols, said phenols being reacted with 6–60 ethylene oxide units, such as heptyl-phenoxypolyethoxyethanols, octylphenoxypolyethoxy-ethanols, methyloctylphenoxypolyethoxyethanols, nonyl-phenoxypolyethoxyethanols, dodecylphenoxypolyethoxy-ethanols; ethylene oxide derivatives of long-chain carboxylic acids, such as lauric, myristic, palmitic, oleic and similar acids containing 6–60 ethylene oxide units per molecule; ethylene oxide condenzation products of long-chain alcohol, such as octyl, decyl, lauryl or cetyl alcohol; ethylene oxide derivatives of etherified or esterified polyhydroxy compounds or long-chain (i.e. having from 10–18 carbon atoms) amines, such as dodecyl amine, hexadecyl amine and octadecyl amine (also containing from 6–60 ethylene oxide units).

Peroxidic compounds may be used as polymerization catalysts in the usual quantities, i.e. about 0.05 to 3% by weight calculated on the total quantity of monomers, examples of these catalysts being potassium- or ammonium persulfate, hydrogen peroxide, tertiary butyl hydroperoxide and cumene hydroperoxide. Redox systems may also advantageously be used, for example potassium persulphate and sodium pyrosulphite or triethanolamine or sodium formaldehyde sulphoxylate. Substances for controlling the molecular weight may also be added, for example dodecylmercaptans. Polymerization is carried out at pH between 2 and 10.

Polymerization is generally continued until the monomers have been completely polymerized.

Polymerization may also be carried out by adding the monomers either in batches or continuously to the polymerizing emulsion. If desired, the polymerization may be started with only a part of the emulsion, and the rest of the emulsion may be added continuously.

The graft polymers according to the present process and of the composition described above forms stable, aqueous dispersions or latices, having a solids content between 10 and 60%, preferably 30 and 50%. The films prepared from the aqueous dispersions have high elasticity, high strength and good stability to light, heat and oxygen.

It is remarkable that the elasticity and strength of the films are considerably greater than those of copolymers which have the same gross composition but in which the butadiene was copolymerized in the monomeric form with the other components. The difference is particularly marked when the butadiene contents are low, for example below 30%. With higher butadiene contents, these differences between copolymers and graft copolymers become less, but on the other hand, the other disadvantages mentioned above for copolymers become more marked.

It is surprising that the resistance against atmospheric influences (light, oxygen, heat) is conspicuously better in the graft copolymers prepared according to the present process than in copolymers.

The copolymers prepared according to the present process and the films, coatings and similar structures produced from them have not only the advantages given above but also the particular ability to undergo subsequent cross-linking by application of heat and/or acid. The complete cross-linkage which thereby takes place renders these structures completely insoluble in organic solvents and practically completely resistant to swelling. Cross-linking is effected within a few minutes at 150–200° C. This temperature may be lowered to about 80–120° C. if acids or compounds that split off acids at higher temperatures are used. Suitable acids for this purpose include sulphuric acid, phosphoric acid, oxalic acid and tartaric acid. Suitable compounds that split off acids include ammonium chloride, ammonium phosphate and ammonium thiocyanate. The amount of acid sufficient for the cross-linking reaction is given by the pH-value of the aqueous polymer dispersion: a pH-value of at least 5 or lower should be observed. Cross-linking takes place more slowly when carried out at lower temperatures, for example 80° C., in the presence of acids.

The stable aqueous dispersions of copolymers prepared in accordance with the present process are eminently suitable for example for producing coatings, covering layers etc. on leather, glass or metals and for sizing such materials, and particularly also for bonding wood, cardboard etc. and finally as bonding agents for pigments.

With the aid of the above defined polymer dispersions as binding agents, flat structures made from all types of fibres of natural, synthetic or mineral origin may be formed. The fibre fleeces may be prepared in known manner by carding or similar processes. The fleeces, with their fibres parallel, may be stacked in several layers so that the fibres of the different layers run in different directions. It is also possible to use fibre fleeces in which the fibres are quite irregular in their direction.

All the usual and known processes are suitable for manufacturing solidified fleeces by means of the above-described graft polymers.

The polymer dispersions may be applied by impregnation or by spraying for example. This may be carried out in two stages consisting for example of a preliminary solidification by an impregnation process. In a conventional process for example the partly solid fleece is passed through a pair of rollers simultaneously with the bonding mixture to give uniform impregnation. The polymer dispersions are adjusted to a suitable concentration for processing, generally between 10 and 30% solids content in the dispersion (by dilution with water). In principle, the polymer dispersion may be processed at any pH, but in practice the pH is generally relatively strongly acid, because the acid donors generally added to the dispersion for cross-linking shift the pH into the acid region.

The impregnated fleeces may be treated with other bonding agents, dressing agents or cross-linking agents before or after drying, for example condensation products of urea or melamine and formaldehyde. Such condensation products may, if desired, already be added to the impregnation mixture which, however, consists substantially of the polymer dispersions according to the invention.

The impregnated fleeces are dried at temperatures at which the polymer undergoes spontaneous cross-linking due to the condensation reactions of the built-in-methylol ether or Mannich base groups. Temperatures of 100 to 200° C. are generally employed. By adding acids or compounds which split off acids at high temperatures, e.g. phosphoric acid, maleic acid, tartaric acid, ammonium phosphate, ammonium nitrate or ammonium thiocyanate, this temperature may be lowered, for example to 80 to 130° C.

The above described graft polymer dispersions lead to the production of flat structures having a springy elastic and soft handle. This property has hitherto only been obtained in flat structures which have been treated with rubber-like polymers, i.e. polymers with more than 40% butadiene.

This springy elasticity of the flat structures bonded with the graft polymers according to the invention is particularly surprising because ordinary copolymers having the same quantity of butadiene, e.g. 10% do not have this effect. Copolymers prepared with such small quantities of butadiene already give the "board-like, dead" handle of unmodified acrylic ester polymers.

The flat structures produced with the aid of the above-described graft polymers are distinguished not only by their good elastic handle but also by very good resistance to ageing, i.e. they do not yellow under the action of light and heat in air. With the aid of these polymers, it is possible to produce pure white flat structures, e.g. fleeces. They are, moreover, resistant to chemical cleaning agents, e.g. perchloroethylene and resistant to boiling in soda, i.e. they do not lose their good properties such as high strength and springy elasticity. Other advantages are their high resistance to tearing and their high puncture resistance and their porosity.

In addition to this preferred application for strengthening fibre fleeces, the abovedescribed polymer dispersions may also be used in processes for the manufacture of other flat structures by impregnating or coating, for example woven and knitted fabrics, paper and cardboard.

The process will be further described in the Examples given hereinafter. The parts given are parts by weight unless otherwise indicated.

*Example 1*

25 parts of a 40% polybutadiene latex (latex A, for method of preparation see below) and 134.5 parts of a solution of water freed from salt, 4 parts of sodium alkyl sulphonate with about 16 carbon atoms and 0.5 part of triethanolamine are mixed in a polymerization vessel of glass equipped with stirrer, thermometer, reflux cooler and gas inlet tube. 85 parts of acrylic acid butyl ester and 5 parts of methacrylamide methyl methylol ether are emulsified in this mixture. The air is displaced by the introduction of nitrogen. After heating the emulsion to 30° C., 0.3 part of potassium persulphate dissolved in 5 parts of water are added. Polymerization sets in immediately and is completed after 5 hours. The 38% polymer dispersion obtained is stable and contains no granulate.

10 cc. of the dispersion obtained are poured out on to a glass plate measuring 10 x 10 cm. The film formed after drying in air has high elasticity and strength, i.e. it has a rubber-like character. In a second film, the dispersion was previously adjusted to pH 3 with N-sulphuric acid. After heating for 5 minutes at 130° C., this film is insoluble in organic solvents such as toluene, acetone or dimethylformamide and swells only slightly. Practically no discoloration is observed in the film after several days exposure to light.

*Preparation of polybutadiene latex A.*—100 parts of butadiene in a solution of 4 parts of a sodium alkyl sulphonate with about 14–16 carbon atoms and 0.05 part of sodium hydroxide in 140 parts of water are emulsified in the absence of air in a pressure autoclave of stainless steel and polymerized at 45–55° C. by the addition of 0.3 part of potassium persulphate. A 40% latex is obtained after polymerization for about 60 hours, and unreacted butadiene is removed from it by stirring in vacuo.

*Comparison experiments.*—(a) This experiment demonstrates the disadvantages of a process in which the dispersion is prepared not by graft copolymerization with polybutadiene but by copolymerization with the same quantity of butadiene monomer.

A solution of 5 parts of sodium alkyl sulphonate with about 16 carbon atoms and 0.5 part of triethanolamine in 145 parts of water is placed in a pressure autoclave equipped with stirrer and thermometer. A mixture of 85 parts of acrylic acid butyl ester and 5 parts of methacrylamide methylol methyl ether is emulsified in this solution. When the air has been displaced by nitrogen, 10 parts of butadiene are introduced under pressure into the closed autoclave. The temperature is raised to 30° C. Polymerization is started by introducing, under pressure, 0.3 part of potassium persulphate dissolved in 5 parts of water. A finely granular coagulated dispersion is formed after polymerization for about 10 hours. No stable dispersion is obtained even after repeating the experiment several times.

(b) The experiment demonstrates the properties of a polymer which contains no methylol ether but has otherwise been prepared as described under (a). A 37% dispersion is obtained, from which a film is produced as described in Example 1. The film has low elasticity and strength. It tears even when subjected to relatively low tensions. After heating to 130° C. (see Example 1), the film swells in organic solvents to an amorphous structure.

(c) This experiment demonstrates the properties of a polymer which has been prepared as in Example I but without methacrylamide methylol methyl ether.

Although the film produced from the dispersion has good elasticity and strength, it undergoes strong swelling in organic solvents after it has been heated to 130° C. (see Example 1). The polymers prepared according to paragraphs (a) to (c) lie outside the scope of the present invention.

*Examples 2–8*

The proportion of butadiene polymer was varied in a series of seven polymer dispersions. The processes were otherwise carried out as in Example 1. The following table summarises the composition of the polymers and the properties of the polymer films:

| Example No. | Polymer PBD [1] | Composition | | | Properties of the films [5] | | |
|---|---|---|---|---|---|---|---|
| | | | ABE [2] | MAAM [3] | Elasticity | Strength | Resistance to ageing [4] |
| 2 | 0 | | 95 | 5 | 5 | 4 | 1 |
| 3 | 3 | | 92 | 5 | 3 | 3 | 1 |
| 4 | [6] 10 | | 85 | 5 | 1 | 1 | 1 |
| 5 | 20 | | 75 | 5 | 1 | 1 | 1 |
| 6 | 30 | | 65 | 5 | 2 | 2 | 2 |
| 7 | 40 | | 55 | 5 | 3 | 3 | 3 |
| 8 | 50 | | 45 | 5 | 4 | 3 | 4 |

[1] Polybutadiene.
[2] Acrylic acid butyl ester.
[3] Methacrylamide methylol methyl ether.
[4] The films were heated at 80° C. for 24 hours.
[5] Interpretation: 1=very good, 2=good, 3=moderate, 4=slight, 5=poor.
[6] Corresponds to Example 1.

Even a 3% butadiene polymer markedly improves the elasticity and strength of the polymer. From 40% butadiene polymer upwards, elasticity and strength become markedly reduced. The resistance to aging is also reduced, i.e. the polymer films are discolored yellow or brown when heated to 80° C.

The polymers of Examples 2 and 8 lie outside the scope of the invention.

*Example 9*

25 parts of a 40% butadiene-acrylonitrile copolymer latex containing 35% acrylonitrile in the copolymer (latex B, for method of preparation see below) are mixed with a solution of 125 parts of water, 5 parts of an oxyethylated stearyl alcohol with 16 ethylene oxide units as emulsifier in the glass polymerization vessel described in Example 1. 78 parts of acrylic acid butyl ester, 10 parts of styrene and 3 parts of methacrylamide methylol ether are emulsified in this mixture. When the air has been displaced by nitrogen, the temperature of the stirred emulsion is raised to 50° C. Polymerization sets in almost immediately on addition of 0.3 part of sodium metabisulphite and 0.3 part of potassium persulphate per 5 parts of water. Polymerization is complete after about 6 hours. A very stable 38% dispersion is obtained. The films produced from these dispersions as described in Example 1 have high elasticity and strength. They are not discolored brown when heated at 80° C. for 24 hours. A film heated at 130° C. for 5 minutes is insoluble in organic solvents and swells only very slightly in these solvents.

*Preparation of butadiene-acrylonitrile copolymer latex (latex B).*—A solution of 4 parts of sodium alkyl sulphonate with 14 to 16 carbon atoms and 0.2 part of a sodium alkyl sulphinate with 14 to 16 carbon atoms dissolved in 145 parts of water is placed in a pressure resistant stainless steel autoclave equipped with stirrer. After displacing the air by nitrogen, 35 parts of acrylonitrile are added and 65 parts of butadiene are introduced under pressure and the mixture is emulsified. By introducing 0.5 part of N-sulphuric acid under pressure, the pH of the emulsion is lowered to about 3. Polymerization begins at 20° C. and is completed after about 7 hours. The remaining monomers are removed by stirring the latex in vacuo. The dispersion obtained contains 40% polymer.

*Example 10*

A solution of 90 parts of water freed from solvent and 0.5 part of sodium alkylsulphonate with about 14 to 16 carbon atoms and 0.1 part of potassium persulphate is placed in a pressure autoclave of stainless steel equipped with stirrer and thermometer. After displacing the air by nitrogen, 3 parts of styrene are emulsified in this solution and 10 parts of butadiene are introduced under pressure. By heating the autoclave to 50° C., practically all the monomer is polymerized completely in about 12 hours. A solution of 5 parts of any oxyethylated oleyl alcohol with about 16 ethylene oxide units, dissolved in 40 parts of water, are added to this latex of a butadiene-styrene copolymer. 63 parts of acrylic acid butyl ester, 4 parts of methacrylamide methylol methyl ether and 20 parts of methacrylic acid methyl ester are then emulsified in it.

0.3 part of sodium pyrosulphite and 0.3 part of potassium persulphate, each dissolved in 10 parts of water, are then added at 45° C. Polymerization starts at once and is completed after 8 hours. A 38.5% stable dispersion is obtained. The films obtained are elastic and are not discolored after heating for 24 hours at 80° C. and only swell very slightly in organic solvents after being heated for 5 minutes at 130° C.

*Examples 11–18*

Various graft copolymer dispersions are prepared as in Example 1 except that they contain 5 parts of one of the following compounds instead of methacrylamide methylol methyl ether:

(11) 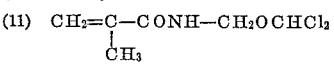

(12) 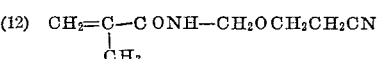

(13) 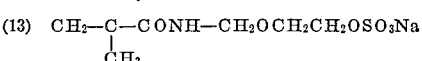

(14) 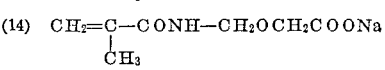

(15) 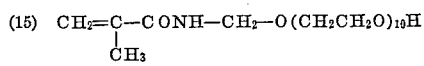

(16) 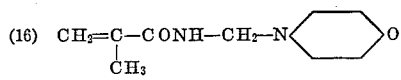

(17) 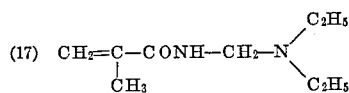

(18) 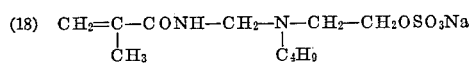

Stable copolymer dispersions are obtained in all 8 cases. The polymer films prepared from them have the same good properties as those prepared in Example 1.

*Example 19*

A disoriented fibre fleece of natural cellulose fibres arranged between screens is impregnated with the following mixture:

400 parts of a polymer dispersion diluted to a polymer concentration of 25% and prepared by copolymerization of
25 parts of polybutadiene latex (40%)
75 parts of acrylic acid butyl ester
10 parts of styrene
5 parts of methacrylamide methyl methylol ether
135 parts of water
5 parts of oxyethylated oleyl alcohol with about 15 ethylene oxide units
6 parts of a 30% aqueous solution of commercial melamine-formaldehyde precondensate
20 parts of a 10% aqueous ammonium chloride solution The impregnated fleece is freed from excess mixture by squeezing between rollers and at the same time compressed to the desired thickness. It is then dried in air and then heated in a continuous furnace at 130° C. for 30 minutes for cross-linking.

When white fibrous material is used, the fleece is a pure white color which is not impaired, as is usually the case when rubber-like bonding agents are used, by the polymer in the bonding agent. The product is characterized by a soft but at the same time elastic handle. To test the fleece for fastness to a boiling wash, it is boiled for about 10 minutes in a 0.7% solution of a commercial alkaline detergent. In the process, it does not lose its elastic handle. To test the fleece for its resistance to solvents, it is shaken for 20 minutes at room temperature in trichloroethylene. The good elastic handle is fully maintained. To test the age resistance, the fleece is exposed to oxygen at an oxygen pressure of 21 atmospheres to 70° C. in an oxygen bomb. There is only very slight discoloration after 10 days. There is no hardening of the handle.

When the fleece is illuminated with a UV lamp (Ultra-vitalux) at a distance of 40 cm. the yellow discoloration is hardly perceptible after 72 hours.

*Example 20*

An unoriented fibre fleece consisting of a mixture of synthetic and natural fibres is impregnated as described in Example 1 with the following mixture:

400 parts of a polymer dispersion diluted to a polymer concentration of 25%, prepared by graft polymerization of
52.6 parts of a 38% butadiene-acrylonitrile copolymer latex with 35% acrylonitrile
75.0 parts of acrylic acid butyl ester
5.0 parts of methacrylic amide methylol butyl ether
117.4 parts of water
3.0 parts of sodium alkyl sulphonate with about 16 carbon atoms
20 parts of a 10% aqueous solution of ammonium chloride The wet fleece is treated as described in Example 1. The same good results are obtained as described in Example 1.

*Example 21*

An unoriented fibre fleece consisting of a mixture of natural and synthetic fibres is impregnated, as described in Example 1, with the following mixture:

400 parts of a polymer dispersion, diluted to a polymer content of 25%, prepared by graft polymerization of
28.6 parts of a 35% butadiene-styrene copolymer latex with 25% styrene
45.0 parts of acrylic acid butyl ester
36.0 parts of acrylic acid ethyl ester
4.0 parts of the compound: $CH_2=C(CH_3)-CONH-CH_2OCH_2COOH$
121.4 parts of water
2.0 parts of sodium alkyl sulphonate with 16 carbon atoms
3.0 parts of oxyethylated stearyl alcohol with about 20 ethylene oxide units
6.0 parts of a 30% aqueous solution of commercial melamine-formaldehyde precondensate
20.0 parts of 10% aqueous ammonium chloride solution.

The wet fleece is treated as described in Example 1. The same good results are obtained with the tests as described in Example 1.

*Example 22*

An unoriented fibre fleece consisting of a mixture of cellulose- and Perlon fibres is treated as described in Example 1 with the following mixture:

400 parts of a polymer dispersion diluted to a polymer content of 25%, prepared by graft polymerization of
38.5 parts of a 39% polychloroprene latex
69.0 parts of acrylic acid butyl ester
10.0 parts of acrylonitrile
2.0 parts of acrylamide
4.0 parts of the compound 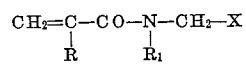
126.5 parts of water
5.0 parts of an oxyethylated oleyl alcohol with about 15 ethylene oxide units.
20 parts of a 10% aqueous ammonium phosphate solution.

The impregnated fleece is treated as described in Example 1. In the rest described in Example 1, the pure white fleece has a good springy elastic handle, good resistance to boiling wash, very good resistance to solvent and good resistance to ageing.

In the foregoing examples it is also possible to apply as acidic cross-linking agent sulphuric acid or phophoric acid as well as acidic salts such as $KHSO_4$ or $NaH_2PO_4$ (in corresponding amounts) without any disadvantage.

What is claimed is:

1. A coagulation-stable aqueous copolymer dispersion comprising water and 10–60% of a dispersed graft copolymer of
   (a) 1–50% of a polymer of aliphatic conjugated diolefine having 4–6 carbon atoms,
   (b) 98.8–30% of acrylic acid ester with 1–8 carbon atoms in the alkyl group and
   (c) .2–20% of acryl amide methylol derivative of the formula $$CH_2=C(R)-CO-N(R_1)-CH_2-X$$

wherein X is a member selected from the group consisting of —O—R$_2$, —O—R$_3$—Z, and

wherein R is a member selected from the group consisting of hydrogen and methyl; R$_1$ is a member selected from the group consisting of hydrogen and alkyl of 1–8 carbon atoms; R$_2$ is a member selected from the group consisting of a saturated aliphatic hydrocarbon containing 1–10 carbon atoms, and unsaturated aliphatic hydrocarbon of 1–10 carbon atoms; R$_3$ is a divalent saturated aliphatic hydrocarbon radical of 1–3 carbon atoms; Z is a member selected from the group consisting of —COOH, —OSO$_3$H, the corresponding sodium, potassium and ammonium salts, —SO$_3$H, the corresponding sodium, potassium and ammonium salts, halogen, —CN and —(CH$_2$CH$_2$O)$_n$H, wherein $n$ is 1–20; R$_4$ and R$_5$ individually are members selected from the group consisting of alkyl of 1–8 carbon atoms, cycloalkyl, and —R$_3$—Z, and R$_4$ together with R$_5$ and the adjacent nitrogen atom are members selected from the group consisting of piperidino and morpholino, the above graft copolymer being admixed with about 0.1–15% of a non-ionic emulsifier, calculated on the total amount of polymer.

2. A stable aqueous graft copolymer dispersion as claimed in claim 1, wherein said graft copolymer is such one of
 (a) 3–30% of polybutadiene prepared by polymerization in aqueous emulsion,
 (b) 96–60% of acrylic acid butyl ester and
 (c) 1–10% of methacrylamide methylol methyl ether.

3. A stable aqueous graft copolymer dispersion as claimed in claim 2, wherein in said graft copolymer up to 50% by weight of the acrylic acid butyl ester component is replaced by a comparable amount of a member selected from the the group consisting of a methacrylic acid ester having from 1–12 carbon atoms in the ester alkyl group, styrene, methacryl amide, acryl amide, vinyl ester and maleic acid alkyl ester.

4. A cross-linked copolymer obtained by heating to temperatures of between 80 and 200° C., the copolymer film, which is obtained after applying a copolymer dispersion according to claim 1 to a substrate selected from the group consisting of leather, glass, and metal and evaporating the water.

5. A cross-linked copolymer obtained by heating to a temperature between 80 and 120° C. in the presence of an acidic substance which acidifies the aqueous copolymer emulsion to a pH-value not exceeding 5, a copolymer film which is obtained after applying a copolymer dispersion according to claim 1 to a substrate and evaporating the water.

6. A process for the manufacture of flat structures by treating fibrous substrates with copolymers of acrylic acid esters which comprises employing as binding agents aqueous dispersions of graft copolymers according to claim 1 and subsequently cross-linking by heating to temperatures between 80 and 200° C.

7. A process for the maufacture of flat structures by treating fibrous substrates with copolymers based on acrylic acid esters which comprises employing as binding agents aqueous dispersions of graft copolymers according to claim 1 and subsequently cross-linking by heating to temperatures between 80 and 120° C. in presence of an acidic substance capable of acidifying the aqueous copolymer dispersion to a pH not exceeding 5.

References Cited by the Examiner

UNITED STATES PATENTS 2,595,907   5/1952   Thomas et al. _____ 260—85.5

FOREIGN PATENTS 644,005   7/1962   Canada.

MURRAY TILLMAN, *Primary Examiner.*

WILLIAM H. SHORT, J. ZIEGLER, *Assistant Examiners.*